(12) United States Patent
Eyben et al.

(10) Patent No.: US 10,991,384 B2
(45) Date of Patent: Apr. 27, 2021

(54) METHOD FOR AUTOMATIC AFFECTIVE STATE INFERENCE AND AN AUTOMATED AFFECTIVE STATE INFERENCE SYSTEM

(71) Applicant: audEERING GmbH, Gilching (DE)

(72) Inventors: Florian Eyben, Gilching (DE); Klaus R. Scherer, Gilching (DE); Björn W. Schuller, Gilching (DE)

(73) Assignee: audEERING GMBH, Gilching (DE)

( * ) Notice: Subject to any disclaimer, the term of this patent is extended or adjusted under 35 U.S.C. 154(b) by 321 days.

(21) Appl. No.: 15/959,045

(22) Filed: Apr. 20, 2018

(65) Prior Publication Data

US 2018/0308508 A1    Oct. 25, 2018

(30) Foreign Application Priority Data

Apr. 21, 2017    (EP) .................................... 17167581

(51) Int. Cl.
*G10L 25/63*    (2013.01)
*G10L 25/27*    (2013.01)
*G06N 5/04*    (2006.01)

(52) U.S. Cl.
CPC .............. *G10L 25/63* (2013.01); *G06N 5/046* (2013.01); *G10L 25/27* (2013.01)

(58) Field of Classification Search
None
See application file for complete search history.

(56) References Cited

U.S. PATENT DOCUMENTS 5,774,846 A * 6/1998 Morii .................... G10L 19/06
                                              704/202
5,927,988 A * 7/1999 Jenkins ................... G09B 5/04
                                              434/116

(Continued)

FOREIGN PATENT DOCUMENTS

WO    2007098560 A1    9/2007

OTHER PUBLICATIONS

El Ayadi, M. et al., "Survey on Speech Emotion Recognition: Features, Classification Schemes, and Databases," Pattern Recognition, GB, vol. 44, No. 3, XP027503083, Mar. 1, 2011, 16 pages.

(Continued)

*Primary Examiner* — Thuykhanh Le
(74) *Attorney, Agent, or Firm* — Slater Matsil, LLP (57) ABSTRACT

A method for automatic affective state inference from speech signals and an automated affective state interference system are disclosed. In an embodiment the method includes capturing speech signals of a target speaker, extracting one or more acoustic voice parameters from the captured speech signals, calibrating voice markers on basis of the one or more acoustic voice parameters that have been extracted from the speech signals of the target speaker, one or more speaker-inherent reference parameters of the target speaker and one or more inter-speaker reference parameters of a sample of reference speakers, applying at least one set of prediction rules that are based on an appraisal criteria to the calibrated voice markers for inferring two or more appraisal criteria scores relating to appraisal of affect-eliciting events with which the target speaker is confronted and assigning one or more affective state terms to the two or more appraisal criteria scores.

15 Claims, 1 Drawing Sheet

(56) References Cited

U.S. PATENT DOCUMENTS

| | | | |
|---|---|---|---|
| 6,151,571 A | 11/2000 | Pertrushin | |
| 6,577,998 B1* | 6/2003 | Yamamoto | G10L 21/06 704/205 |
| 6,675,145 B1* | 1/2004 | Yehia | G10L 15/00 704/270 |
| 6,823,310 B2* | 11/2004 | Ishito | G10L 21/04 704/270 |
| 7,165,033 B1* | 1/2007 | Liberman | G10L 17/26 704/206 |
| 7,286,987 B2* | 10/2007 | Roy | G10L 15/08 704/270 |
| 7,457,752 B2* | 11/2008 | Oudeyer | G10L 13/033 700/1 |
| 7,460,998 B2* | 12/2008 | Perlo | A01K 15/02 600/300 |
| 7,502,738 B2* | 3/2009 | Kennewick | G10L 15/22 704/257 |
| 7,571,099 B2* | 8/2009 | Saito | G10L 13/033 704/254 |
| 7,606,701 B2 | 10/2009 | Degani et al. | |
| 7,729,916 B2* | 6/2010 | Coffman | G10L 15/22 704/270 |
| 7,881,934 B2* | 2/2011 | Endo | G10L 17/26 704/251 |
| 8,078,470 B2 | 12/2011 | Levanon et al. | |
| 8,190,434 B2* | 5/2012 | Kameyama | G10L 15/22 704/270 |
| 8,195,460 B2 | 6/2012 | Degani et al. | |
| 8,209,182 B2 | 6/2012 | Narayanan | |
| 8,296,143 B2* | 10/2012 | Kudoh | G10L 21/04 704/258 |
| 8,352,277 B2* | 1/2013 | Bennett | G06F 16/951 704/270.1 |
| 8,428,953 B2* | 4/2013 | Ono | G10L 19/02 704/267 |
| 8,682,666 B2 | 3/2014 | Degani et al. | |
| 8,694,307 B2* | 4/2014 | Shammass | G10L 25/63 704/211 |
| 8,768,708 B2 | 7/2014 | Levanon et al. | |
| 8,965,762 B2* | 2/2015 | Song | G10L 25/63 704/236 |
| 9,009,052 B2* | 4/2015 | Nakano | G10H 1/06 704/268 |
| 9,240,188 B2* | 1/2016 | Paul | G10L 25/63 |
| 2002/0138274 A1* | 9/2002 | Sharma | G10L 15/065 704/270 |
| 2003/0028384 A1* | 2/2003 | Kemp | G10L 17/26 704/275 |
| 2003/0033145 A1 | 2/2003 | Petrushin | |
| 2003/0069728 A1* | 4/2003 | Tato | G10L 17/26 704/231 |
| 2003/0163320 A1* | 8/2003 | Yamazaki | G10L 13/033 704/270 |
| 2003/0191627 A1 | 10/2003 | Au | |
| 2004/0249634 A1 | 12/2004 | Degani et al. | |
| 2006/0122834 A1 | 6/2006 | Bennett | |
| 2008/0010071 A1* | 1/2008 | Callahan | G10L 15/24 704/270 |
| 2008/0120113 A1* | 5/2008 | Loyall | G06F 3/011 704/270 |
| 2008/0147413 A1* | 6/2008 | Sobol-Shikler | G10L 13/033 704/278 |
| 2009/0313018 A1 | 12/2009 | Degani et al. | |
| 2011/0099015 A1* | 4/2011 | Zopf | G10L 21/00 704/270 |
| 2011/0295607 A1 | 12/2011 | Krishnan et al. | |
| 2012/0069131 A1* | 3/2012 | Abelow | G06Q 10/067 348/14.01 |
| 2012/0116772 A1* | 5/2012 | Jones | G16H 40/67 704/270 |
| 2012/0221336 A1 | 8/2012 | Degani et al. | |
| 2014/0278363 A1* | 9/2014 | Allen | G06F 16/3344 704/9 |
| 2014/0343923 A1* | 11/2014 | Heilman | G06F 40/30 704/9 |
| 2016/0104486 A1* | 4/2016 | Penilla | G10L 15/005 704/232 |
| 2016/0196836 A1* | 7/2016 | Yu | G10L 25/90 704/207 |
| 2016/0196837 A1* | 7/2016 | Levanon | G06F 19/00 704/270 |
| 2016/0210985 A1* | 7/2016 | Deleeuw | G10L 15/22 |
| 2017/0076740 A1* | 3/2017 | Feast | G06F 17/00 |
| 2017/0154293 A1* | 6/2017 | Baduge | G10L 25/87 |
| 2017/0202002 A1* | 7/2017 | Han | H04Q 9/00 |
| 2017/0206913 A1* | 7/2017 | Nahman | G10L 25/63 |
| 2017/0206915 A1* | 7/2017 | Prasad | G10L 25/63 |
| 2017/0289619 A1* | 10/2017 | Xu | H04N 21/251 |
| 2018/0183930 A1* | 6/2018 | Raanani | G06F 16/3344 |
| 2019/0027162 A1* | 1/2019 | Fukayama | G06N 20/10 |

OTHER PUBLICATIONS

Eyben, F. et al., "The Geneva Minimalistic Acoustic Parameter Set (GeMAPS) for Voice Research and Affective Computing," IEEE Transactions on Affective Computing, vol. 7, No. 2, Apr.-Jun. 2016, 13 pages.

Fitch, W.T., "Vocal Tract Length and Formant Frequency Dispersion Correlate with Body Size in Rhesus Macaques," The Journal of the Acoustical Society of America 102 (2), 1997, 11 pages.

Fontaine, J.R.J. et al., "Components of Emotional Meaning: A Sourcebook (Series in Affective Science)," Oxford University Press, Sep. 2013, Abstract Only, 3 pages.

Gentsch, K. et al., "Appraisals Generate Specific Configurations of Facial Muscle Movements in a Gambling Task: Evidence for the Component Process Model of Emotion," PlosOne, Research Article, 10(8): e0135837, doi:10.1371/journal.pone.0135837, Aug. 21, 2015, 30 pages.

Gentsch, K. et al., "Temporal Dynamics of Event-related Potentials Related to Goal Conduciveness and Power Appraisals," Psychophysiology, 50 (10), 2013 Society for Psychophysiological Research, 2013, 13 pages.

Gillioz, C. et al., "Mapping Emotion Terms into Affective Space Further Evidence for a Four-Dimensional Structure," Swiss Journal of Psychology, 75 (3), Short Research Note, 2016, 8 pages.

Patel, S. et al., "Mapping Emotions into Acoustic Space: The Role of Voice Production," Biological Psychology, NL, vol. 87, No. 1, XP028188226, Feb. 17, 2011, 6 pages.

Scherer, K.R., "Appraisal Considered as a Process of Multilevel Sequential Checking," K. R. Scherer, A. Schorr, & T. Johnstone (Eds.). Appraisal Processes in Emotion: Theory, Methods, Research, New York and Oxford: Oxford University Press, 2001, 29 pages.

Scherer, K.R., "The Dynamic Architecture of Emotion: Evidence for the Component Process Model," Cognition and Emotion, 23(7), 2009, 46 pages.

Scherer, K.R., "Vocal Communication of Emotion: A Review of Research Paradigms," Speech Communication (40), Department of Psychology, University of Geneva, 2003, 30 pages.

Scherer, K.R., "What are Emotions? And How Can They be Measured?," Social Science Information, vol. 44(4), 2005, 35 pages.

Weninger, F. et al., "On the Acoustics of Emotion in Audio: What Speech, Music, and Sound Have in Common," Frontiers in Psychology, vol. 4, XP055412202, Jan. 1, 2013, 12 pages.

* cited by examiner

METHOD FOR AUTOMATIC AFFECTIVE STATE INFERENCE AND AN AUTOMATED AFFECTIVE STATE INFERENCE SYSTEM

CROSS-REFERENCE TO RELATED APPLICATIONS

This application claims the benefit of European Patent Application No. 17167581.2, filed on Apr. 21, 2017, which application is hereby incorporated herein by reference.

TECHNICAL FIELD

The invention concerns a method for automatic affective state inference from speech signals and an automated affective state inference system.

BACKGROUND

The project leading to this application has received funding from the European Research Council (ERC) under the European Union's Horizon 2020 research and innovation programme (grant agreement No 680883).

Conventional emotion detection systems based on the voice or the face assume that there is a direct correspondence between static emotional states as natural classes, in the sense of universal, invariable attributes, and specific, definitive patterns of acoustic parameters or facial muscle contractions, for example, allowing for detection and identification of emotions on the basis of simple machine learning or pattern-matching paradigms. In conventional emotion recognition systems, speech is recorded via, e.g., a microphone and digitalized, then acoustic features are extracted in a brute-force way, i.e., several low-level descriptors such as Mel-Frequency Cepstral Coefficients, MFCC, (Log.) Mel-spectral bands, spectral statistics such as spectral slopes or spectral entropy, fundamental frequency, voice quality (Jitter, Shimmer), and/or signal energy, for example, are computed from overlapping short time windows, e.g., 20-60 ms, of the digitalized speech audio signal. Next, the acoustic features are summarized over a longer speech unit, e.g., a word, phrase or sentence or even a fixed length window, e.g., 1-10 seconds typically, by applying a set of statistical functionals such as extremes, range, mean, variance, percentiles, regression coefficients, etc. to all low-level descriptors. Based on the resulting fixed length feature vectors, a machine learning method is applied, e.g., nearest neighbor classifier, Gaussian mixture model, support-vector machine, neural network of which the parameters are estimated, e.g., with a statistical optimization method on a data-set where perceived emotional categories or emotional dimensions have been hand-labelled by expert raters.

Although these approaches might provide reasonable results for some cases, the underlying assumption for these systems is unsubstantiated because—in contrast to conventional methods—modern affective sciences concur that emotions, rather than being static, well-defined states, are processes with many different components of the body that constantly emerge on the basis of recursive cognitive evaluations of the environment and somatosensory feedback. These complex emotion processes cannot be easily subsumed under a single descriptive emotion label such as fear or sadness. Rather, given the extraordinary complexity of the possible interactions between the determinants involved, one has to assume a near infinity of different affective processes. Evidence for this assumption is found by the fact that different individuals experience the exact same events in very different ways, experiencing different emotions, and that most self-reports of emotional experiences are mixed or blended emotions rather than only one of a limited class of basic emotions. Consequently, it seems impossible to reliably detect the precise nature of emotion processes by matching observed patterns (acoustic, visual) to observer ratings.

The appraisal criteria provide an approach for overcoming the disadvantages of conventional emotion detection. The basics of appraisal criteria and appraisal theory are described in:

Scherer, K. R. (2001). Appraisal considered as a process of multi-level sequential checking. In K. R. Scherer, A. Schorr, & T. Johnstone (Eds.). Appraisal processes in emotion: Theory, Methods, Research (pp. 92-120). New York and Oxford: Oxford University Press.

Scherer, K. R. (2003). Vocal communication of emotion: A review of research paradigms. Speech Communication, 40, 227-256.

Scherer, K. R. (2005). What are emotions? And how can they be measured? Social Science Information, 44(4), 693-727.

Scherer, K. R. (2009). The dynamic architecture of emotion: Evidence for the component process model. Cognition and Emotion, 23(7), 1307-1351.

Patel, S., Scherer, K. R., Bjorkner, E., & Sundberg, J. (2011). Mapping emotions into acoustic space: The role of voice production. Biological Psychology, 87, 93-98.

Gentsch, K., Grandjean, D., & Scherer, K. R. (2013). Temporal dynamics of event-related potentials related to goal conduciveness and power appraisals. Psychophysiology, 50(10), 1010-1022.

Fontaine, J. R. J., Scherer, K. R., & Soriano, C. (Eds.). (2013). Components of emotional meaning: A sourcebook. Oxford: Oxford University Press.

Gentsch, K., Grandjean, D., & Scherer, K. R. (2015). Cumulative sequential appraisals generate specific configurations of facial muscle movements: Evidence for the Component Process Model of Emotion. PlosOne, 10(8): e0135837. doi:10.1371/journal.pone.0135837.

SUMMARY

Embodiments of the invention provide an improved method and system for automatic affective state inference from speech signals.

In various embodiments the method for automatic affective state inference from speech signals comprises the following steps: capturing speech signals of a target speaker, extracting one or more acoustic voice parameters from the captured speech signals, calibrating voice markers on the basis of the one or more acoustic voice parameters, that have been extracted from the speech signals of the target speaker, and one or more speaker-inherent reference parameters of the target speaker and one or more inter-speaker reference parameters of a sample of reference speakers, applying at least one set of prediction rules that are based on the appraisal criteria to the calibrated voice markers for inferring two or more appraisal criteria scores relating to appraisal of affect-eliciting events with which the target speaker is confronted, and assigning one or more affective state terms to the two or more appraisal criteria scores describing the affective state or states most likely experienced by the target speaker before or while the speech signal was produced.

In various further embodiments the automated affective state inference system for determining one or more affective states of a target speaker based on the analysis of speech signals comprises: an input being suitable for providing speech signals to the system, an acoustic voice parameter calculator coupled to the input and being suitable for extracting one or more acoustic voice parameters from the speech signals, a calibrator coupled to the acoustic voice parameter calculator and being suitable for calibrating voice markers of the target speaker, the calibration being based on the one or more acoustic voice parameters provided by the acoustic voice parameter calculator and one or more speaker-inherent reference parameters of the target speaker and one or more inter-speaker reference parameters of a sample of reference speakers, a predictor coupled to the calibrator and being suitable for inferring two or more appraisal criteria scores from the voice markers by at least one set of prediction rules, that is based on the appraisal criteria, and an affective state decider coupled to the predictor and being suitable for assigning one or more affective state terms to the two or more appraisal criteria scores.

In one embodiment, the appraisal criteria are novelty, pleasantness/conduciveness, control/coping and urgency/excitation of the affect-eliciting event. From the component process model (CPM) an affect eliciting event is any event which triggers an emotional response in a living being, where the emotional response includes a physiological change of the voice production mechanism of that living being (e.g., a human person) related to the emotional response or emotional state of the being. E.g., if a person receives news that they have won a large cash prize, the person might perform the following sequence of appraisal criteria checks: first, it is checked if the event is novel, i.e., unexpected—in the event of the prize the novelty is assumed to be high, and a physiological reaction might be triggered such as a spontaneous vocalization (e.g., scream); next, the person checks if the event is good or bad (pleasantness appraisal criterion)—for the prize in this example we assume it to be good/pleasant; this might result in a raised pitch and increased pitch variation in the spontaneous vocalization; then, the person checks if she/he has control over the event/situation or in other words can cope with the situation (control/coping appraisal criterion), and finally whether immediate action needs to be taken (e.g., continuing to scream, and starting to talk with increased loudness, speed, and variation about what one would do with the prize money)—which reflects the urgency for action appraisal check; Combining all the individual appraisal check results, and an affective state or a mixture of states manifests in the person's consciousness (surprise and joy in this example), where the physiological cues (changes to the voice) can be measured by our disclosed invention and assigned to individual appraisal criteria and from these appraisal scores an overall affective state can be deduced.

In an alternative embodiment, less than four of these appraisal criteria may be used.

Extracting one acoustic voice parameter of the one or more acoustic voice parameters may comprise calculating a set of intermediate values from the speech signals that are provided within a given time segment and calculating a statistical value from the set of intermediate values or summarizing the intermediate values of the set of intermediate values. A weighted sum may be calculated in this step. The intermediate values are weighted with a time-dependent weighting function in dependence on one of the appraisal criteria. Different weighting functions, each giving stronger weighting to a different moment in the time segment, are used for extracting acoustic voice parameters for inferring appraisal criteria scores related to different appraisal criteria.

In other words, a weighting function related to novelty may give strong weighting to one moment in the time segment, the moment being earlier than a moment to which a weighting function related to urgency may give strong weighting. The weighting functions related to novelty, pleasantness/conduciveness, control/coping and urgency/excitation give strong weighting to different moments within the same time segment. The acoustic voice parameter calculator of the automated affective state inference system is suitable for performing the above-mentioned steps.

Acoustic voice parameter extraction may be based on statistics of (intermediate) acoustic parameters over a given unit or parts of this unit forming the segment, e.g., a word, a phrase, a sentence, or a fixed length segment of speech, which does not need to correspond to any semantic unit. Acoustic parameters may be based on basic features, like fundamental frequency, e.g., its mean, variation or slopes; loudness, e.g., its mean, variation or slopes, spectral balance, formants. Acoustic parameters may be based on novel features such as formant dispersion, fundamental frequency ratios (of intra and inter syllable), pitch modulation cepstra. Acoustic parameters may be based on theory-motivated features like intensity (sender energy) to release energy, which relates to urgency, and loudness (received loudness), which relates to power and control. Acoustic parameters may be based on temporal features, where the point in a speech utterance where a feature is computed is based on theoretical relevance of this point to show information in acoustic voice parameters about a particular appraisal assessment step (urgency, coping, valence, etc.).

Preferably the acoustic voice parameters are based on at least one parameter selected from the group consisting of fundamental frequency, pitch, loudness, intensity, perturbation of fundamental frequency, jitter, shimmer, harmonics to noise ratio, spectral balance, spectral envelope, formant frequency bandwidth, formant frequency amplitude and cepstral coefficients, and on at least one parameter selected from the group consisting of cepstral energy, enhanced cepstral peak prominence, cepstral peak variation, formant dispersion weighted by formant bandwidth, ratio of intra to inter syllable or pseudo-syllable fundamental frequency, ratio of intra to inter syllable or pseudo-syllable intensity variation, ratio of intra to inter syllable or pseudo-syllable loudness variation, a prosodic coherence measure, a statistic of the modulation spectrum of fundamental frequency, a statistic of the modulation spectrum of intensity, a statistic of the modulation spectrum of loudness, and a measure of vocal effort.

Calibration may be performed on the basis of the one or more acoustic voice parameters that have been extracted from the speech signals of the target speaker, and speaker-specific mean values of these one or more acoustic voice parameters extracted from reference speech signals of the target speaker during an initial calibration phase and respective per-speaker average variances of one or more acoustic voice parameters having been computed over speech signals of the sample of reference speakers.

The calibrator may be suitable for the above-mentioned calibration as well as calculating and storing speaker-specific mean values of the one or more acoustic voice parameters and storing inter-speaker average variances of the one or more acoustic voice parameters. The variances may be calculated by the calibrator itself or provided by an external source.

The average variances may be computed over a sample of reference speakers. From a few, e.g., emotionally neutral calibration sentences, such as reading a few sentences, from the target speaker only the mean values are computed. This approach does not need calibration speech with a full emotional range to compute reliable variances.

Nevertheless, the mean values and/or the average variances may be updated dynamically to the target speaker after the initial calibration phase. The choice of final variances for the calibration process may be performed by choosing maximum of a reference variance and a target variance.

In order to apply the prediction rules, which are speaker-independent relative trends for z-scores of acoustic voice parameters, the acoustic voice parameters may be transformed to speaker specific voice markers by a z-transformation, which subtracts the mean and normalizes by the standard deviation, i.e., the square root of the variance, using above calibration means and variances.

The two or more appraisal criteria scores may be inferred by different sets of prediction rules, the different sets of prediction rules being based on different combinations of voice markers. One of the appraisal criteria scores is based on a multitude of partial appraisal criteria scores, one partial appraisal criteria score being calculated from one of the voice markers or a weighted sum of a group of voice markers.

One of the prediction rules may comprise a linear relationship between one of the voice markers and one of the partial appraisal criteria scores or a non-linear relationship between one of the voice markers and one of the partial appraisal criteria scores. The predictor of the automated affective state inference system is suitable for performing the above-mentioned steps.

In embodiments, one prediction rule, also called predictor and being a function, is usually used per voice marker. Linear, logistic, quadratic, or cubic predictors, or any of the aforementioned clipped to a limited range, may model a functional relation $y=f(x)$ between the appraisal criteria score x and the voice marker y. Nevertheless, other non-linear functions or table lookups are possible. In order to predict the appraisal criterium score from the voice marker, the functions must be invertible. In the case of functions where only parts are invertible, e.g., quadratic, all other predictors that are uniquely invertible are evaluated first to obtain a first estimate prediction, which is then used to select the part of the respective predictor function which needs to be inverted. Some predictors might not be able to return a result, e.g., if the given voice marker value is outside of the invertible range of the function or outside of the defined range of the function, in which case no result is returned. A final prediction is computed by applying a weight factor to the output of each predictor that has provided a result. Weight factors ideally sum to one, thus for the predictors that have provided a result the weight factors are normalized to sum one. Weight factors can be pre-initialized based on statistics on reference data. A confidence measure is computed on the basis of the variance of the individual predictors regarding the final prediction result.

In further embodiment, assigning one or more affective state terms comprises forming a vector of the two or more appraisal criteria scores, computing vector distances between the vector and reference vectors representing affective states, thereby inferring strengths of these affective states of the target speaker, and assigning one or more affective state terms to the vector in dependence on the vector distances. The affective state decider of the automated affective state inference system is suitable for performing the above-mentioned steps.

In yet other embodiment reference points of the reference vector are emotion categories with appraisal criteria score labels. They can be empirically determined, e.g., by semantic assessment of emotion category names by several emotion descriptive terms and reduction of data to, e.g., four dimensions which can be mapped to appraisal dimensions, as described, e.g., in:

Gillioz, C., Fontaine, J. R., Soriano, C., & Scherer, K. R. (2016). Mapping Emotion Terms into Affective Space. Swiss Journal of Psychology, 75(3), 141-148., or by expert definition of these points based on psychological knowledge, or by both or any other method. Based on the reference vectors and a given observed tuple of appraisal criteria scores, the strength of the emotion category corresponding to each reference point can be computed by a distance metric which considers the linear/Euclidean distance in combination with the angular distance, e.g., based on scalar product. The strongest or closest emotion categories are the most likely felt and expressed emotions. In this way, not only a single, e.g., strongest, emotion can be detected, but a mix of emotions can be detected and described by the affective state terms. The case of mixed emotion expressions occurs frequently in practice.

BRIEF DESCRIPTION OF THE DRAWINGS

Non-limiting, exemplary embodiments of the invention will now be described with reference to the accompanying drawings, in which.

DETAILED DESCRIPTION OF ILLUSTRATIVE EMBODIMENTS

Figure 1:
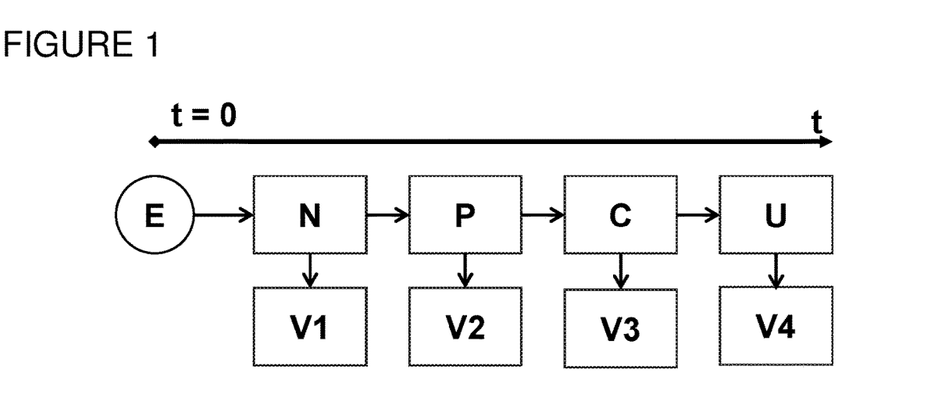
FIG. 1 shows the component process model of emotion.

FIG. 1 shows the Component Process Model of emotion, CPM. A person evaluates or appraises an event E, also called object, action or situation, on a number of criteria in a sequential temporal order along the time axis t, starting at the event at t=0 based on the nature of the event N, e.g., unexpectedness of the occurrence, also called novelty, the appreciation of the consequences of the event with respect to the individual's preferences and goals P, also called degree of pleasantness/conduciveness, the individuals perceived ability to cope with the consequences of the event C, also called degree of control/power, and the perceived need to prepare the organism rapidly for appropriate actions U, also called urgency. These appraisals occur in the given temporal order N, P, C, U as each appraisal check is dependent on the outcome of the previous checks. The mental and bodily reaction of the person is directly determined by the outcome of each check in the sequence producing a cumulative change V1-V4 in the different response components including physiological changes, vocal, facial and bodily expressions, mental feeling states, where for the present invention the vocal component is considered. V1 is the vocal reaction evoked by novelty N, e.g., by a novel event, such as a sudden vocal outburst. V2 is the vocal reaction to pleasantness/conduciveness P, e.g., a pleasant or unpleasant event, such as a wide vs. narrow voice. V3 is the vocal reaction to control/power C, the assessment of coping potential, such as a full or thin voice. V4 is the vocal reaction to urgency U, the assessment of the urgency of action, such as a tense or lax voice or fast or slow pace. The present invention allows to separately measure each of these response configurations from the voice, allowing to infer the nature of the appraisal outcomes in the sequence. The appraisal profiles are then used to estimate the precise nature of the emotional response in terms of probable verbal descriptors.

The method is based on a completely different assumption in respect to conventional emotion detection. In particular, this invention is based on the assumption that emotion processes consist of lawfully interrelated, synchronized trajectories of mutually interactive components, see FIG. 1: cognitive evaluation, which is an affective process, eliciting action tendencies accompanied by physiological processes and motor expressions in face, voice, and body/physiology, all reflected in subjective experience. Only in some cases is the latter component followed by a verbal description of the experience by one or, usually, several affective descriptor labels or affective state terms. Emotion detection or diagnosis by external observers or computer systems is hampered by the fact that there are no known techniques to objectively analyze the cognitive or physiological process or the process of subjective experience of the emotion. Self-report, i.e., description of the felt states through affective state terms, is notoriously unreliable and, for all practical purposes, unavailable. While it becomes increasingly feasible to measure some physiological processes via sensors, the specificity of the response patterns and the reliability of the consequent inference is so far highly unsatisfactory. Consequently, the method focuses on the most readily available indicator, vocal expression, as the source for the inference of underlying emotion processes. The voice provides a continuous, dynamic readout of the ongoing emotion process as long as a person vocalizes.

The method provides continuous objective analysis of acoustic voice parameters which allow to infer underlying changes in the phonation and articulation process caused by the cognitive, physiological and motor expression processes. Specifically, the results of voice research have accumulated theoretical knowledge on the mental and physiological origins of different voice production processes. The present invention presents a technical method to build a system that makes use of the theoretical knowledge for automatically inferring the underlying affective process from observed markers in voice recordings.

In the affective process, see FIG. 1, there are four main appraisal criteria against which emotion-eliciting events are checked in order to assess the subjective relevance and elicit action tendencies and subjective feelings: the novelty or unexpectedness of the event N (the novelty criterium), the intrinsic pleasantness or goal conduciveness of an event P (the pleasantness/conduciveness criterium), the ability of the person to control or cope with the event C (the control/coping criterium), and the resulting urgency for action and behavioral excitation U (urgency/excitation criterium).

These four criteria affect the vocal production mechanism. Thus, the degree of presence or absence of specific voice markers created by the motor expressions resulting from the outcome of the affective process based on those four appraisal checks can be physically observed by technical systems. This allows to infer the result of the affective process of appraisal checks based on speaker-dependent voice markers, which in turn can be derived from objectively measured acoustic voice parameters.

Conventional methods directly map the acoustic voice parameters to categorical or dimensional emotion descriptors, obtained from observer ratings, using statistical models, regression or prediction rules, or more complex machine learning methods such as (deep) neural networks or support-vector machines, for example. No inference or understanding of the underlying emotional process, which relates to the actual felt subjective affective state or emotion, is obtained by conventional methods.

The inventive method overcomes this deficiency by introducing a novel mathematical and algorithmic formulation of the inference process from acoustic voice parameters to the underlying appraisal criteria based on the above-described theoretical psychological model of the affective process from Scherer's Component Process Model, see FIG. 1, resulting in a numerical score for the result of each appraisal check (appraisal criterium score). Based on the appraisal criterium scores, likelihoods are determined for a plurality of affective state terms (e.g., emotion category names, mood states, etc.) that together most likely describe the affective state experienced by the person from whom the measured sample of speech stems.

The advantages of the described invention can be summarized as: The invention allows to infer details about the underlying affective process, and thus allows to predict subjectively felt and experienced emotions, while conventional methods only allow a gross estimate of what emotions have been present. The invention allows to infer subtle affective states and blends of affective states. The invention does not suffer from common problems of machine learning algorithms, such as over-fitting to the training database, because the invention uses predictor rules which have been—in addition to statistical analysis—selected and shaped mostly according to a substantial body of voice sciences and psychological theories. By using a plurality of at least three predictors, the invention allows to infer a confidence measure for the certainty of the prediction of each appraisal criterium score, which can be translated into a confidence measure for the certainty for inferred affective states. The invention can make use of temporal information of the affective process and relate observed voice markers and associated appraisal criteria scores to certain points in time. This helps to understand the affective process better by considering a temporal pattern of voice marker observations in contrast to only a static voice marker pattern. Further, by determining the exact timing of voice production events related to the affective process, other contextual information such as linguistic content, physiological parameters, facial expressions, or environmental and situational context can be considered at a higher level decision to increase the precision of the estimate.

Figure 2:
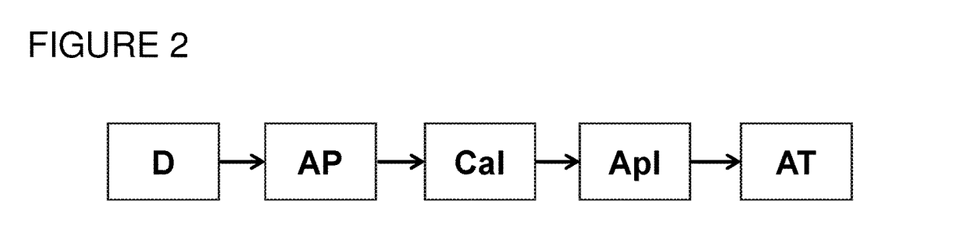
FIG. 2 shows the steps of a method for automatic affective state inference from speech signals.

FIG. 2 shows steps of the inventive method: speech is recorded and digitalized, D, e.g., by a microphone, a pre-amplifier and an analogue-to-digital conversion or alternatively, available digital audio material is used; next, measurement of the relevant acoustic voice parameters is performed, AP, and a calibration of the acoustic voice parameters to control inter-speaker variations such as vocal tract architecture variations is performed, Cal, by which the acoustic voice parameters are transformed to speaker specific voice markers; from these voice markers, appraisal criteria scores related to the underlying affective process are inferred based on a plurality of linear and non-linear prediction rules, Apl, where each predictor is related to one or more voice markers, and based on two to four fundamental appraisal criteria scores, the affective state terms are determined, AT, e.g., names of emotion categories either single or blended, which best describe the affective state on a verbal/semantic level, i.e., by the probability of being used by native speakers to describe the respective emotion episode experienced by the speaker.

Overall, the method consists of five major steps as shown in FIG. 2:

1. One step includes capturing speech signals of a target speaker, D, which may include speech recording by a microphone, pre-amplifier and analogue-to-digital conversion. Nevertheless recording can be skipped if digital audio material is already available as an alternative form of captured speech signals.

2. One step includes extracting one or more acoustic voice parameters from the captured speech signals, AP, which may include measurement of acoustic voice parameters.

3. One step includes calibrating voice markers on the basis of the one or more acoustic voice parameters, Cal. The speaker calibration includes conversion of acoustic voice parameters to speaker-specific voice markers.

4. One step includes applying at least one set of prediction rules that are based on the appraisal criteria to the calibrated voice markers for inferring appraisal criteria scores relating to appraisal of affect-eliciting events with which the target speaker is confronted, Apl. The inference of the appraisal criteria scores related to the underlying affective process is based on a plurality of linear and non-linear inference rules (predictors) where each predictor is related to one or more voice markers.

5. One step includes assigning one or more affective state terms to the two or more appraisal criteria scores describing the affective state or states most likely, AT. This is done by estimating one or more affective state terms and associated likelihoods and strengths which together best describe the affective state, as identified by the predicted appraisal criteria scores, on a verbal/semantic level.

These steps are described in detail in the following paragraphs and reference implementations are given.

In order to apply the digital signal processing algorithms of steps AP, Cal, Apl, AT, a prerequisite is to have a digitally sampled audio signal. In order to record such a signal, if not already available, a device is required which converts air pressure waves into an analogue electric current, e.g., a microphone, accelerometer sensor, etc. and another device which converts the electric current into a time series of digital numeric values (sampling and quantization of the analogue electric signal) is required. For sampling, ideally at least 8000 values are sampled per second and up to 96000 values per second. Lower or higher values might also be possible in some implementations. The typical set-up is to use conventional microphones, such as electret condenser microphones and analogue-to-digital converter integrated circuits, e.g., as is used in most embedded computing devices such as smartphones and tablets. The choice of recording device is not limited to this example, as any type of microphone, or even other sensors such as accelerometers or mechanical devices can be used. Also the conversion from electrical current to a digital series of values can be performed alternative to, e.g., an electrical sample-and-hold circuit, by a digital camera which tracks mechanical vibrations on a surface, or by, e.g., a laser beam or other appropriate sensor to measure mechanical vibrations or air pressure changes directly.

In an ideal implementation only speech signals are recorded in this fashion. However, in practical applications there might be other non-speech sounds, e.g., noise, overlaid over speech, or regions without speech and only non-speech sounds, or completely silent regions. Thus in a favorable implementation, in order to extract regions with only speech, voice activity detection or speech activity detection is employed at this step.

Further, in an even more favorable implementation, speech enhancement technologies are applied to remove non-speech sounds which are overlaid or mixed with the speech signal of interest.

The measurement of acoustic voice parameters AP involves digital signal processing algorithms for computing a plurality of low-level acoustic voice parameters and then summarizing these low-level acoustic voice parameters over adequate speech segments, such as words, phrases, sentences, or alternatively speech segments of fixed length, e.g., between 0.5 seconds and 10 seconds, where longer segments are also possible in some implementations. The choice of acoustic voice parameters and the basic concept of computation of the like is based on the prior art of the Geneva Acoustic Minimalistic Acoustic Parameter Set (GeMAPS), introduced in Eyben, F., Scherer, K. R., Schuller, B. W., Sundberg, J., André, E., Busso, C., . . . & Truong, K. P. (2016). The Geneva minimalistic acoustic parameter set (GeMAPS) for voice research and affective computing. IEEE Transactions on Affective Computing, 7(2), 190-202., but has been augmented for the invention by important novel acoustic voice parameters and fundamental variations of the computation scheme for selected parameters.

In such a typical implementation, measurement, or computation in the digital domain, of low-level acoustic voice parameters is performed via short-time analysis, i.e., the series of digital audio samples from the previous step D is partitioned into windows sometimes also referred to as frames, which typically have a length between about 5 milliseconds (ms) and 100 ms. The favorable implementation uses in particular two window lengths for two different sets of acoustic voice parameters. The first, window A, is 20 ms and the second, window B, is 60 ms. Adjacent windows are sampled in an overlapping fashion, where the distance between the start points of the windows (window sampling period) is a constant value, typically but not limited to smaller or equal to the length of the window. Favorable values range from 5 to 25 ms, where the favorable implementation uses 10 ms.

Further steps typically involve application of a windowing function to the window of audio samples (multiplication with the window function), such as a Hamming, Hanning or Gaussian window function. Then, some acoustic voice parameters can be computed from the time-domain signal of the window. Examples for such parameters are the rate of zero crossings, the signal energy (also referred to as intensity), Linear Predictive Coding Coefficients and based on these, vocal-tract Formant Frequencies, Amplitudes, and Bandwidths, or Glottal closure instants, for example, micro prosodic variations from one voice pitch period to the next and higher order aggregates such as Jitter (frequency variations) or Shimmer (amplitude variations), Harmonics-to-Noise ratio, or the Fundamental Frequency (F0). Other parameters are favorably computed in the spectral or Cepstral domains. A time-frequency transformation is required, where typically a Discrete-Fourier-Transformation often implemented by the Fast-Fourier Transformation algorithm is used, but other transformations such as Wavelet, Constant-Q, or Gabor or Octave-band digital filterbanks can be alternatively employed. From the spectral representation of each window, the magnitudes (energies) of the individual spectral bands are of interest for derivation of further acoustic voice parameters. These could include a derivation of the probability that a frame contains a voice (e.g., periodic/harmonic) signal, Fundamental Frequency (F0) or the actual psychoacoustically perceived pitch of the speech signal via algorithms which consider the harmonic series of the fundamental tone, such as sub-harmonic sampling (SHS), or an estimation of psychoacoustically perceived loudness (e.g., as summation of energies in psychoacoustically motivated, e.g., non-linear bandwidth, spectral bands with a weighting function according to an equal loudness curve), or measures of spectral energy distribution and spectral balance, spectrally derived Harmonics-to-Noise Ratio (e.g., by autocorrelation), or Cepstral coefficients such as Mel- or Bark-Frequency Cepstral Coefficients.

Several post-processing steps on the raw low-level acoustic voice parameters are beneficial. For fundamental frequency F0 or pitch in particular they include Viterbi-algorithm, i.e., cost-based smoothing of the pitch contour, to avoid, e.g., jumps between voiced and unvoiced segments as well as sporadic wrong jumps between double and half the actual F0 or pitch. A similar post-processing is applicable to Formant trajectories. Further, a temporal moving average filter with, e.g., 3 or 5 frames width is commonly applied to the low-level acoustic parameters to create temporally smooth contours and filter out potential artefacts caused by the short-time windowing. Such smoothing favorably excludes hard boundaries from smoothing, e.g., F0 transitions from the value 0 (for unvoiced frames) to a valid F0 value>0 or reverse.

In the next step, the low-level acoustic voice parameters are summarized over time over relevant speech segments to obtain acoustic voice parameters. This is typically done by computing statistics within the segment, such as arithmetic mean, standard deviation, or the arithmetic mean and standard deviation of slopes of a low-level acoustic voice parameter contour. Alternatively to the arithmetic mean, other mean representations are known, or, for spectral low-level acoustic parameters, a long-term average spectrum (LTAS) is known to be employed as a summarization step before computation of spectral statistics or Cepstral parameters.

Other possible summarization statistics include the percentage of frames which are above a certain relative level, the percentage of frames where the signal slope is falling or rising, percentiles (e.g., median, quartiles) and inter percentile ranges.

In a favorable implementation the summaries are applied separately for voiced regions of the speech segment and for unvoiced regions of the speech segment, if the underlying low-level acoustic voice parameter is defined/valid for unvoiced regions (e.g., for F0 this is not the case, but for Loudness of Intensity it is).

The method introduces an alternative temporal sub-segmentation scheme, where temporal sub-segments are defined based on the theoretical temporal order of appraisal checks in human cognition as shown in FIG. 1. This scheme is most effective when the assumption holds true that the analyzed speech segment is a direct response to an emotion-triggering event. In this case, e.g., the first response according to CPM theory relates to the Novelty appraisal criterium, followed by the Pleasantness appraisal criterium. Thus, acoustic voice parameters and subsequently derived voice markers, step Cal, in the first, e.g., 500 or 1000 ms of the speech segment are most relevant for inference of the Novelty appraisal criterium, while acoustic voice parameters from 500 to 2000 ms, for example, might be most relevant for Pleasantness. The present invention does not explicitly name a precise temporal range, as this depends on the actual implementation and use-case. An exemplary choice of the temporal range is based on neuroscientific studies, where voice parameters indicating novelty can be found in first 1000 ms (a step function is used as window—see below, and only the parameters of the first 1000 ms of an utterance are considered for predicting novelty); acoustic voice parameters indicating urgency are most relevant from 1500 ms onwards, thus the first 1500 ms are excluded (step function—see below) when computing acoustic voice parameters for urgency prediction, unless the utterance is shorter than 2000 ms—in this case the full utterance is considered; for pleasantness the range between 500 ms and 2000 ms is weighted linearly and from 2000 ms to 6000 ms (or the end of the utterance) a linearly falling slope is used for weighting; acoustic voice parameters for control are computed from 1000 ms onwards.

Technically, the temporal sub-segmentation can favorably be implemented by a weighting function which is applied to the low-level acoustic parameters during the summarization (e.g., computation of a weighted arithmetic mean, standard deviation, weighted percentiles, etc.). Two types are favorable realizations:

(1) A step function, or a logistic function, which is (step function) or approaches (logistic function) zero before the start time of the relevant window and is or approaches 1 after the start of the relevant sub-segment and either remains 1 until the end of the speech segment or is or approaches zero again after the end of the relevant sub-segment.

(2) A modified Rayleigh-distribution density function r $$r(x|\sigma) = \frac{x}{\sigma^2} e^{-\frac{x^2}{2\sigma^2}}$$

where parameter $\sigma$ is favourably set to the centre $x_c$ of the relevant sub-segment for the respective appraisal criterium and the amplitude of the function is favourably scaled such that $r(x_c)=1$.

The method relies primarily, but not limited, on acoustic voice parameters such as:

A parameter may primarily be an indicator of urgency and control. A measurement of voice Fundamental Frequency (F0) or Pitch and a mean statistic of it within a speech segment, e.g., arithmetic mean or median or similar percentile, and a mean statistic describing at least one of mean rising and falling slopes of the F0 (or Pitch) contour (computed from a local minimum of the contour to the next local maximum and vice versa). Further beneficial are a variation statistic, e.g., variance or standard deviation, and the ratio of a low (e.g., 10-25%) to a high (e.g., 75-90%) percentile.

A parameter may be a psychoacoustic Loudness measure, i.e., received loudness in an observer—especially for control appraisal criteria, and signal Intensity (signal energy as delivered by sender—especially for urgency appraisal criterium) and of these a mean statistic within a speech segment (e.g., arithmetic mean or median or similar percentile), standard deviation, and rising and falling slopes (relevant, e.g., for novelty) as well as the ratio of a low, e.g., 10-25%, to a high, e.g., 75-90%, percentile.

A parameter may be perturbation measures (Jitter, Shimmer of F0 or Pitch and Harmonics-to-Noise ratio) and of these a mean and a variation statistic, especially for pleasantness.

A parameter may be Spectral Balance (Spectral Slope and ratios of low-frequency energy content to high frequency energy content, where the cut-off is usually between 500-2000 Hz but is not limited to this range), Formant Amplitudes and Formant Bandwidths, as well as lower order Mel-Frequency-Cepstral Coefficients (MFCCs), esp. coefficients number 1-3 which similarly relate to the spectral energy distribution or spectral balance. These are indicators of energy in higher harmonics, and relate to expression strength and associated non-linearities in the vocal production system, which are highly relevant for all appraisal criteria, but even more for urgency and control.

In addition to the acoustic voice parameters described above, the following novel acoustic voice parameters are favorable to the method:

Statistics of the modulation spectrum of F0 and/or Loudness or Intensity, e.g., dominant peak position, spectral centroid, spectral slope, spectral entropy, and spectral balance, e.g., as indicators of (in order of importance) pleasantness, control and urgency.

Prosodic coherence parameters: e.g., Pearson Correlation Coefficients of Intensity and/or Loudness to F0 and/or pitch, or differences between rising and falling slopes of temporally aligned intensity and/or loudness and F0 and/or pitch contours, e.g., as indicators of pleasantness (synchrony in the articulation process) and control.

The ratio of intra (pseudo-)syllable F0 variation (e.g., standard deviation) to the inter-syllable variation of the intra-syllable F0 means, whereby a pseudo-syllable, e.g., is defined by a continuous region of voiced frames. Relevant, e.g., as a combined indicator of pleasantness (higher within syllable F0 variation due to smoother production process) and urgency (higher inter-syllable variation).

The same above intra-syllable vs. inter-syllable variation measures applied to loudness or intensity, or any other relevant acoustic voice parameter.

Formant Dispersion as described in:

Fitch, W. T. (1997). Vocal tract length and formant frequency dispersion correlate with body size in rhesus macaques. The Journal of the Acoustical Society of America, 102(2), 1213-1222, and here modified with a formant bandwidth weighting (i.e., the distances between neighboring formants are inversely weighted with the bandwidths of the corresponding formants) as a correlate to vocal tract length and presumably articulation clarity, relevant, e.g., as an indicator of control.

A measure of Cepstral energy, favorably computed only for voiced speech segments and expressed as a logarithmic quantity. The Cepstral energy is computed based on the maximum value in a Cepstrum (a Cepstrum Cis obtained by the Inverse discrete Fourier transformation of the log. magnitude spectrum):

$$E_{ceps} = 20\log_{10}\left(\max_{\forall i} C_i\right)$$

Calculated from the same Cepstrum and favorably only from voiced segments, an enhanced measure of Cepstral peak prominence (eCPP) as well as Cepstral peak variation (CPV):

A Cepstral peak with amplitude $y_p$ which is the global maximum within a temporal window [a;b] is found at location $x_p$ in [a;b], where the window corresponds, e.g., to an expected range of F0 period lengths, e.g., the part of the Cepstrum where an F0 or excitation/source function peak (Dirac impulse in theory) is to be expected.

A line y=m·x+t is fitted (e.g., least squares or closed form fit equation) to best match all samples in the window [a;b] and is evaluated at $x=x_p$ to yield $y_p^{lin}=m·x_p+t$.

From the window [a;b] the region around the peak (with a two-sided epsilon threshold) is excluded and the standard deviation σ is computed from the remaining region of the window.

eCPP is computed as based on the ratio of the peak amplitude $y_p$ to $y_p^{lin}$ adjusted by the standard deviation, e.g., $y_p^{lin}+σ$. Preferably the ratio is expressed in decibel (dB), e.g:

$$eCPP=20·\log_{10}(y_p-y_p^{lin}-σ)dB.$$

CPV expresses the variation of the Cepstrum in the window [a;b] region based preferably on the standard deviation σ, e.g., as:

$$CPV=20·\log_{10}σ.$$

From both the eCPP measure and the CPV measure a coefficient of variation (CoV) is derived as the quotient of standard deviation to arithmetic mean over the speech segment. Alternative implementations may also apply other statistics (slopes or percentiles, for example) or use arithmetic mean and standard deviation or variance alone without computing a CoV ratio.

In contrast to prior art methods to calculate Cepstral Peak Prominence (CPP) the eCPP measure reflects influence of non-linear source/excitation functions due to inclusion of the standard deviation of the non-peak region. This relates directly to extreme physical situations during voice production which could lead to such non-linearities in the voice source production (i.e., vocal-chord vibration).

Two measures of Vocal Effort: The quotient between the fundamental frequency (F0) or pitch and the spectral centroid (both measured in Hz or another suitable common unit of measurement); the lower this quotient is, the higher the effort that is required to produce the given tone with the given fundamental frequency. The second measure is the quotient between signal intensity (e.g., third root of signal energy) and a psychoacoustic Loudness measure (the lower it is, the less effort/energy is needed to achieve the same loudness effect in the receiver/listener).

The actual choice of acoustic voice parameters for a specific implementation is favorably guided by theoretical and empirical observations of the relevance of individual acoustic voice parameters for indicating presence of certain appraisal criteria.

One particular exemplary set of acoustic voice parameters in one example implementation of the invention is given for three appraisal criteria as follows:

Novelty:
1. Minimum or 10-th percentile (or similar) of F0,
2. Range (e.g., difference 20-th to 80-th percentile) of F0,
3. Coefficient of Variation of F0
4. Median of F0
5. Arithmetic mean of MFCC 1 of voiced frames,
6. 90-th percentile of F0

Pleasantness:
1. Standard deviation of loudness,
2. Arithmetic means of formant 1-3 amplitudes,
3. Coefficient of Variation (Ratio of standard deviation and arithmetic mean) of Cepstral energy of voiced frames,
4. Standard deviation of Harmonics-to-Noise Ratio (HNR),
5. Coefficient of Variation (Ratio of standard deviation and arithmetic mean) of 3rd formant amplitude,
6. 80-th percentile and range of 20-th to 80-th of F0
7. Arithmetic mean of MFCC 1, 2, and 4 of voiced frames,
8. Arithmetic mean of spectral slope between 0 and 500 Hz of voiced frames,
9. Arithmetic mean of spectral centroid of voiced frames Urgency:
1. Loudness (psychoacoustic): arithmetic mean of the rising and falling slopes of the temporal contour,
2. Arithmetic mean of formant 1-3 amplitudes, 3. Arithmetic mean of spectral centroid, energy proportion in voiced frames of energy below and above 1 kHz,
4. Arithmetic mean of MFCC 2-4 of voiced frames,
5. Median F0,
6. Standard deviation of Harmonics-to-Noise Ratio (HNR),
7. Arithmetic mean of Cepstral Peak Prominence (eCPP) for voiced frames,
8. Arithmetic mean of formant bandwidth weighted Formant Dispersion Control:
1. Coefficient of Variation of eCPP
2. Coefficient of Variation of Cepstral energy
3. Mean Frequency of Formant #2
4. Spectral Slope from 0-500 Hz of voiced segments
5. Loudness (psychoacoustic): 20-th percentile and percentage of frames above 25% of range.
6. F0 Coefficient of Variation (quotient of standard deviation to arithmetic mean) and F0 range (percentile 20 to 80)
7. Coefficient of Variation of (over all voiced frames in speech segment): Spectral Centroid, Hammarberg Index (quotient of spectral energy peak amplitude between 2000 and 5000 Hz and spectral energy peak amplitude between 0 and 2000 Hz), Quotient of Energy above and below 1000 Hz.
8. Mean (e.g., arithmetic mean or long term average spectrum—LTAS) of spectral energy ratio above and below 500 Hz, above and below 1000 Hz, of Hammarberg Index, and spectral slope from 0 to 500 Hz.
9. Mean of falling and rising slopes of Loudness (psychoacoustic) contour.
10. Standard Deviation (over all voiced frames within a speech segment) of Mel-Frequency Cepstral Coefficients 2-6.
11. Number of loudness Peaks and continuous voiced segments per second (related to speaking rate/tempo).

From the objectively measured acoustic voice parameters from the previous step AP, speaker specific voice markers are derived by calibration Cal. Voice markers describe changes in an individual's (person's) voice relative to a given baseline or reference, preferably derived from the same and only from this individual. This step enables the predictor set, which is applied in step Apl, to be universally valid across a plurality of speakers, as it operates in a speaker-independent domain. Being speaker-independent also implies language independence. Independence from linguistic and phonetic content is also supported by the fact that acoustic voice parameters and voice markers are chosen to be widely independent of linguistic content, firstly by carefully choosing parameters which do not (primarily at least) model linguistic content, e.g., Pitch, Loudness, and secondly by applying statistics over a segment.

An exemplary but functional implementation of voice marker computation is, e.g., to apply a modified z-score transformation, where ideally means are first normalized on subgroups and then variance is normalized over the full data set, to a set of acoustic voice parameters. Thereby each acoustic voice parameter is transformed to a voice marker such that over a baseline speech collection, preferably from only a single individual, the arithmetic mean of each voice marker will be zero and the variance of each voice marker will be one. Transformation rules which are derived from reference speech can then be applied to new, unseen, non-reference speech samples, although the mean of these new samples might not be exactly 0 nor the variance exactly 1.

A common problem in the derivation of the voice markers is the gathering of the reference data from a single speaker. Ideally the data should contain all extremes of vocal utterances a speaker is capable of in order to compute an accurate and maximal variance for this speaker. In practice this is seldom possible, as this would require the speaker to portray a plurality of different extreme vocal sounds and emotional utterances. A more common approach is to have people read out loud or speak freely a few calibration or enrolment sentences—typically for related speech analysis technologies such as biometric speaker verification or automatic speech recognition this is in the order of 15-60 seconds. Typically, these sentences are rather emotionally neutral. However, if the calibration variance is computed from non-emotional colored speech, the resulting voice markers and thus the resulting prediction results in step Apl will not be scaled to the correct range (they tend to be too large), which results in a wrong inference of affective term names in step AT.

An alternative, but not preferable, method of computing z-score transformation reference data is to compute means and variances from a data collection of emotionally colored speech expressions from a large number of speakers. However, due to the averaging over many different speakers does not allow for calibration to individual speakers.

In order to allow both for optimal adaptation to individual speakers and for stable variances, a novel approach is shown.

From a training data set which contains a larger number of speakers and highly affective colored speech, favorably balanced in terms of portrayed affective states having high and low or positive and negative samples for each appraisal criterium c, a global average intra-speaker variance $\sigma_{gspk}^{2}$ $(ap)$ for each acoustic voice parameter (ap) is computed as follows: An arithmetic mean of the acoustic voice parameter is computed from the data samples of each speaker. Each speaker's arithmetic mean is subtracted from the acoustic voice parameter data samples, resulting in a zero mean acoustic voice parameter per speaker. Then the variance of the acoustic voice parameter is computed over all data points. The result is an average intra-speaker variance.

For calibration to an individual speaker, a few emotionally neutral (or possibly also emotionally colored) sentences are then recorded, e.g., preferably from predefined phonetically balanced prompts. From these, acoustic voice parameters are computed as described in step AP, and the arithmetic means $\mu_{cal}^{(ap)}$ and variances $\sigma_{cal}^{2(ap)}$ of all acoustic voice parameter samples of the calibration data are computed. Instead of directly using the variances from this set to perform the z-score transformation, for each acoustic parameter a decision based on combining the calibration variance $\sigma_{cal}^{2(ap)}$ with the average intra speaker variance $\sigma_{gspk}^{2(ap)}$ is made, e.g., the final variance $\sigma^2$ favourably used in the z-score transformation to map the acoustic parameter (ap) to a speaker specific voice marker is:

$$\sigma^2 = \max(\min(2 \cdot \sigma_{gspk}^{2(ap)}, \sigma_{cal}^{2(ap)}), \sigma_{gspk}^{2(ap)}).$$

In a further improved implementation, the speaker-specific means and variances can also be updated dynamically after the initial calibration phase. Above max-min rule to infer the actual variances used in the z-score transformation is applied for every update made, with the following modification:

$$\sigma^2 = \max(\min(2 \cdot \sigma_{gspk}^{2(ap)}, \sigma_{cal}^{2(ap)}), \alpha \cdot \sigma_{gspk}^{2(ap)}),$$

where $\alpha$ is a value ideally between 0.5 and 1.0. $\alpha$ is initialized with 1.0 and gradually decreased to 0.5 with a greater amount of amount of speech observed from the same speaker, i.e., with increasing trustability of the speaker specific variance. In an even more advanced implementation variant, α can also be determined from the range of the previously observed appraisal criterium scores from step (4) for this speaker: if the speaker has shown a high range of appraisal criteria scores, α is decreased quicker than when the speaker has only shown a low range of appraisal criterium scores. This can be combined with the amount of observed speech.

In the following step Apl, a plurality of predictors (a predictor set) is applied to a set of voice markers to infer appraisal criteria scores for the appraisal criteria. A specific set of predictors for each appraisal criteria is favorable, as each appraisal check elicits changes in different voice markers. Further, each predictor is a rule which directly relates one voice marker to a partial contribution towards a specific appraisal criterium score, independent of other inputs. Variants of predictors can require additional input, such as, a preliminary appraisal criterium score or even (preliminary) scores from other appraisal criteria, in order to apply different rules for different ranges and combinations of appraisal criteria.

As not all direct relations between voice markers and appraisal criteria scores are linear relations, non-linear predictor types are implemented. In total the following predictor types form the basis of the disclosed invention (x denotes the appraisal criterium score axis, y denotes the voice marker value axis):

Linear: $y = b \cdot x + c$

Clipped linear: $y = \begin{cases} b \cdot x + c & \text{if } x < \text{or} > \xi \\ b \cdot \xi + c & \text{if } x \geq \text{or} \leq \xi \end{cases}$ Quadratic: $y = a \cdot x^2 + b \cdot x + c$ In an improved implementation, refined predictor functions are beneficial:

A logistic function for an exemplary range of x from 1 to 4:

$$y = (p_2 - p_3) \frac{e^{p_1(x-2.5)}}{e^{p_1(x-2.5)} + 1} + p_3,$$

A step function,
An invertible cubic function such as $y = a \cdot x^3 + b \cdot x + c$ where $\text{sgn}(b) = \text{sgn}(a)$.

In further improved alternative implementations, other additional predictor types are possible, even changing of some of the basis predictors by other functions which serve a similar purpose (such as a special fourth order polynomial instead of a quadratic function, for example, or exponential or logarithmic functions instead of clipped linear functions, or Gaussian functions, or piecewise linear approximations, Taylor series of specific functions, etc.).

In order to predict the appraisal criterium score from the voice marker, the functions must be invertible. In the case of functions where only parts are invertible (e.g., quadratic), all other predictors which are uniquely invertible are evaluated first to obtain a first estimate prediction, which is then used to select the part of the respective predictor function which needs to be inverted. Some predictors might not be able to return a result (e.g., if the given voice marker value is outside of the invertible range of the function or outside of the defined range of the function), in which case a special no result marker can be returned, for example.

For the above functions, the inversion is given as:
Linear function:

$$x = \frac{1}{b} \cdot y - \frac{c}{b},$$

Quadratic function, where the x coordinate of the vertex (local max/min) is given as $$x_v = -\frac{b}{2a}$$

and two solutions exist, each for a region right/left of the vertex:

$$x_{right} = -\frac{b}{2a} + \sqrt{\frac{y}{a} - \left(\frac{b}{2a}\right)^2 - \frac{c}{a}},$$

$$x_{right} = -\frac{b}{2a} - \sqrt{\frac{y}{a} - \left(\frac{b}{2a}\right)^2 - \frac{c}{a}},$$

Logistic function:

$$x = 2.5 - \frac{1}{p_1} \log\left(\frac{p_2 - p_3}{y - p_3} - 1\right).$$

For clipped functions, when the voice marker is outside of the defined range of the function, a special value for "undefined value" is returned.

Each predictor is evaluated on a single voice marker or voice marker group. In the case of the voice marker group, members of the group will be averaged (weighted or unweighted) and the predictor will be applied to the average value. The benefit of this aggregation into groups is improved robustness (e.g., against acoustic noise) of the system by combining similar voice markers in this way. These could originate from, e.g., different ways of computing parameters (e.g., F0 based on SHS algorithm or F0 based on an autocorrelation algorithm), or constitute conceptually similar parameters (e.g., energy proportion above/below 500 Hz and 1000 Hz) where it is expected that they would be highly correlated for typical speech signals.

The parameters of the predictor functions, such as a, b, c and $p_1$, $p_2$, $p_3$ are determined once during system design either manually by expert knowledge and theoretical background, or empirically from, e.g., emotional expression data where expert annotations, ideally by the performing speakers, of the underlying appraisal criteria scores exist. This empirical analysis can be done, e.g., by computing the relations between voice markers and appraisal criteria scores as piecewise linear functions (e.g., by obtaining voice marker means for sample points (appraisal criteria score values) by, e.g., MANOVA analysis) and then applying curve fitting techniques and smoothing the curves manually to ensure that they are in line with theoretical predictions.

Designing the predictor set manually in this way allows full control over the set of chosen predictors and it allows to validate each predictor against theoretical knowledge about the underlying voice marker or voice marker group in relation to the appraisal criteria and the effects on the voice production mechanism and, e.g., multiple statistical findings about the underlying voice marker or voice marker group. The introduction of voice marker groups helps to deal with the problem that many voice markers are correlated (co-linear). This is the reason that conventional statistical methods which select optimal parameter sets or which automatically derive a prediction model (e.g., neural networks or support-vector-machines), have problems in considering highly co-linear parameters appropriately or finding the single best one of the correlated parameters. Over-fitting to training data would lead to a (more or less random) choice of one parameter as the presumably best one, however this choice might not generalize well to other data-sets on which the system may be used or evaluated. Further, by adhering to the above-described abstract types of predictors, a twofold smoothing of each predictor is performed which improves generalization further: a) inherent smoothing by forcing an observed relation between voice marker and appraisal criterium score into a given predictor type, b) by discretization and, e.g., manual adjustment of predictor parameters.

A choice of predictors for an exemplary implementation for the pleasantness appraisal criterion includes the following voice markers (calibrated acoustic voice parameters):

A. Standard deviation of loudness,
B. Coefficient of Variation (Ratio of standard deviation and arithmetic mean) of Cepstral energy of voiced frames,
C. Coefficient of Variation (Ratio of standard deviation and arithmetic mean) of 3rd formant amplitude,
D. 80-th percentile of F0
E. Arithmetic mean of MFCC 4 of voiced frames,
F. Standard deviation of Cepstral energy of voiced frames,
G. Standard deviation of Harmonics-to-Noise Ratio (HNR).

The prediction equations for the partial appraisal criteria scores (see below) a-g for the above parameters A-G are given as follows:

$a=-1.25*A+2.00$ for $A>0.0$ (rectified lin. function)

$b=-0.77*B+1.92$ for $B>-0.1$ (rectified lin. function)

$c=-2.00*C+2.50$ for $C>0.0$ (rectified lin. function)

$d=-1.05*D+1.79$ for $D>0.0$ (rectified lin. function)

$e=2.22*E+2.62$ for $E<-0.1$ (rectified lin. function)

$f$: inverse($F=0.21*f^2-1.27*f+1.66$) (quad. pred.)

$g$: inverse($G=0.28*g^2-1.51*g+1.85$) (quad. pred.)

Based on the predictor set for a given appraisal criterium, the predicted (final) appraisal criterium score for this criterium is calculated by the following steps:

1. Combining some (correlated) voice markers to voice marker groups (groups chosen at design time, e.g., manually based on theoretical or statistical relations between the voice markers and underlying acoustic voice parameters).

2. Applying to each voice marker and voice marker group in the predictor set, a predictor for this specific voice marker (group) and obtaining a partial appraisal criterium score. The partial appraisal criterium score is preferably scaled already to the full range of the appraisal criterium score (favorably −1 to +1, or 1 to 4, or 0 to 1, etc.); all predictors should best use the same scaling.

3. Combining the partial appraisal criterium scores to a final appraisal criterium score, preferably by a weighted average of the partial appraisal criterium scores and an optional bias value.

For the above example predictors for pleasantness (P), the weighting factors are:

$P=0.065*a+0.175*b+0.102*c+0.127*d+0.076*e+0.086*f+0.101*g$

Favorably, the weighting is done in an adaptive normalized way: Because each partial predictor produces a value already in the full appraisal criterium score range, the overall weighting should be neutral, e.g., the sum of all weights must be 1.0. As some predictors, depending on the observed voice marker, may return an undefined value, the weights of the valid predictors must be re-normalized to sum 1. Optionally, the final result can be linearly (or non-linearly, e.g., by a logistic function) scaled to compensate for predictor range mismatches.

The weights are preferably tuned manually by a-priori knowledge of theoretical importance parameters or empirically, e.g., by significance weights ($\eta$) of parameters in MANOVA analysis, by linear regression analysis and then using the absolute values of the regression coefficients as weights, or by optimization algorithms (e.g., genetic programming) which optimize the weights, e.g., as to achieve best emotion term recognition results on a given validation set of speech recordings. In contrast to conventional machine learning approaches only the set of summation weights is optimized in this data-centered way, while the predictor parameters can and preferably should be obtained in different ways, as described above.

A confidence measure for an appraisal criterium score is obtained, e.g., as a standard deviation measure across all predictors. In detail, this, e.g., can be done as follows: The square root of the average (weighted with the individual predictor weights) quadratic error between each partial appraisal criterium score and the final appraisal criterium score resembles a confidence score. That is, if all predictors agreed and pointed in the same direction, this value is low—resembling a high confidence of the prediction, while otherwise, if predictors contradict each other, it is high—resembling a low confidence of the prediction. An alternative, less preferred, approach to this confidence computation would be to compute a pairwise error between partial appraisal criterium scores. The non-linear nature of some predictors might require a more sophisticated approach than the basic computation via the variance measure. An additional weighting for the confidence can be implemented by multiplying the confidence as obtained above with the percentage of predictors which have returned a valid value.

The basic representation of the confidence as standard deviation measure allows for interpreting it as a range of uncertainty directly on the scale of the appraisal criteria scores.

In an optimized implementation, predictors which have a high error (measured as the difference between the partial appraisal criterium score and the final appraisal criterium score) based on a pre-defined theoretical or empirical threshold can be removed and a refined final appraisal criterium score is thus obtained, possibly in an iterative manner.

The last step concerns inference of strengths of emotional states from at least two appraisal criterium scores, AT. A tuple of N (2 or more) appraisal criterium scores from one speech observation can be represented as a point or point vector x in an N dimensional appraisal space. In the same space, reference points (or even more favorable: reference confidence regions around a reference point) are placed which correspond to reference affective state terms (e.g., emotion category names). Based on a distance measure, the closeness of each of these reference points to x is calculated.

The development of this feature of the method was made possible by a GRID approach to the semantics of affective state terms by determining semantic profiles for major terms, specified by all major components of emotion elicitation and reactions, for over 25 languages on all continents. This huge data set allows, through advanced principal components and Procrustes rotations, to determine principal component scores on all 4 major appraisal criteria for each of 24 major affective state terms. This approach has been recently extended to over 80 terms for US English, French, and Indonesian. Other ways to define reference points, either theoretical or empirical, are also possible and can be substituted without changing the core concept of the invention.

Based on reference points and a given observed tuple x of appraisal criterium scores, the strength of the emotion category corresponding to each reference point can be computed by a distance metric which considers the scalar (e.g., linear or Euclidean) distance in combination with the angular distance (e.g., based on scalar product, or difference of angles between two point vectors). The strongest (closest) emotion categories are the most likely felt and expressed emotions. In this way, not only a single (e.g., strongest emotion) emotion can be detected, but a mix of emotions can be detected. The case of mixed emotion expressions occurs frequently in practice.

In a favorable implementation, scores for M affective terms $r_m$ are computed for an observed appraisal criterium score vector x as follows:

1. The appraisal criterium scores are scaled such that the range for each criterium is −1 to +1. This step is just for convenience and to simplify the following steps, in alternative implementations it could thus be left out.

2. An overall emotional intensity is computed as the L2-norm of the appraisal criterium score vector.

3. A scalar distance score $d_s$ which considers both the angular distance and the difference in lengths of the two vectors is computed between each reference $r_m$ and the observation x from an angular distance $$d_a = \frac{r_m * x}{\|x\| \cdot \|r_m\|}$$

where * denotes the scalar product of the two vectors and $\|\bullet\|$ denotes a vector norm, e.g., the L2-norm. If $\|x\|<\|r_m\|$ then $$d_s = d_a \cdot \frac{\|x\|}{\|r_m\|},$$

otherwise $$d_s = d_a \cdot \frac{\|r_m\|}{\|x\|}.$$

In the special case of $\|x\|=0$, then $$d_s = \frac{1}{\|r_m\|}$$

or if $\|r_m\|=0$, then $$d_s = \frac{1}{\|x\|}.$$

The scalar distance score $d_s$ is limited to a maximum of 1.0. In the rare case of both $\|x\|=0$ and $\|r_m\|=0$, then $d_s=1$.

An alternative distance metric with similar objectives is:

$$d_c = |d_a^{(degree)}| + 0.33 \cdot \frac{\|x\| - \|r_m\|}{0.01745}.$$

Thereby the factors 0.33 and 0.01745 define the trade-off between a distance difference in degree ($d_a^{(degree)}$) and length of the vector: for each distance of 0.01745 (which corresponds to the Euclidean distance of two points where the corresponding vectors have the same non-zero length but are rotated by one degree around the origin). The 0.33 is the angular distance penalty which corresponds to this 1 degree distance.

4. Affective state terms are ranked by one of the distance scores, where the lowest score is closest. The uniqueness of the top N affective terms is determined then, e.g., by the differences of distances among each other (i.e., if the distance of the best to the second best, is large (normalized to the absolute value of the distance of the closest affective state term).

5. A combined confidence score is computed, e.g., as arithmetic mean of the individual appraisal criterium score confidence measures.

An alternative implementation might consider the confidence scores in computation of the affective state term scores. Thereby the observation x could be represented as a multi-dimensional Gaussian where the variances are given by the confidence scores for each appraisal criterium. In addition to the scalar/angular distance, the multi-dimensional Gaussian is evaluated at each reference point $r_m$, yielding a value g, and the inverse $$\frac{1}{g}$$

is used as the weighting factor to the distance metric. Another alternative is to scale the appraisal criterium scores by the confidence, i.e., for a lower confidence for one score, the corresponding dimension in the N dimensional space will be compressed by scaling it with the value of the confidence, leading to lower differences for the more uncertain confidences. Other ways to consider the confidence measures in distance computation are also possible.

The appraisal criteria urgency, pleasantness, control, may easily be confused with the well-known affective dimensions arousal/activation, valence/evaluation, and dominance/power. While there might be some apparent similarity, one must keep in mind that they are two very distinctly different things: The affective dimensions have been postulated based on a grouping of emotion category terms and thus come from describing observed, discrete, affective states and trying to link them into a continuum; the appraisal criteria are building blocks of the emotional process and describe checks that the perception of events undergoes in human cognitive processing, which then cause reactions that can be observed. In addition, in the current invention the location of an affective state in the appraisal criteria score space is further differentiated by the addition of the novelty criterium. In sum, both the derivation of appraisal criteria score space and the interpretation and mapping of points in this space to affective terms are novel concepts for which the method presents a unique and novel technical solution.

Thus, in the present invention we observe reactions that are known to be related to the underlying appraisal process, i.e., the reactions that the process of feeling an emotion triggers, while conventional approaches which build systems to detect emotions in an arousal-valence-dominance space, directly relate acoustic parameters to observed emotional states, often in a brute-force, purely data-driven way. Technically, the precise inference of the underlying affective process is made possible by relying on speaker-calibrated voice markers, a combination of linear and non-linear prediction functions, where not all predictors might apply to a given observation, because not all prediction rules are valid for all voice markers in all ranges, and a geometrical, multi-dimensional distance metric which combines angular and scalar distance to map an observed point in an appraisal criterium score space to a set of reference points which correspond to affective terms. Said references for affective terms have been derived, e.g., empirically by a large semantic study where a large set of affective terms (e.g., emotion category names) are described by human subjects by a common pool of over 80 emotion-related verbs and adjectives. From these terms, e.g., via Principal Component analysis the four main relevant components are found, and based on the adjectives which constitute each main component, these components are related to the appraisal criteria. Other ways to define reference points, either theoretical or empirical, are also possible and can be substituted without changing the core concept of the invention.

Figure 3:
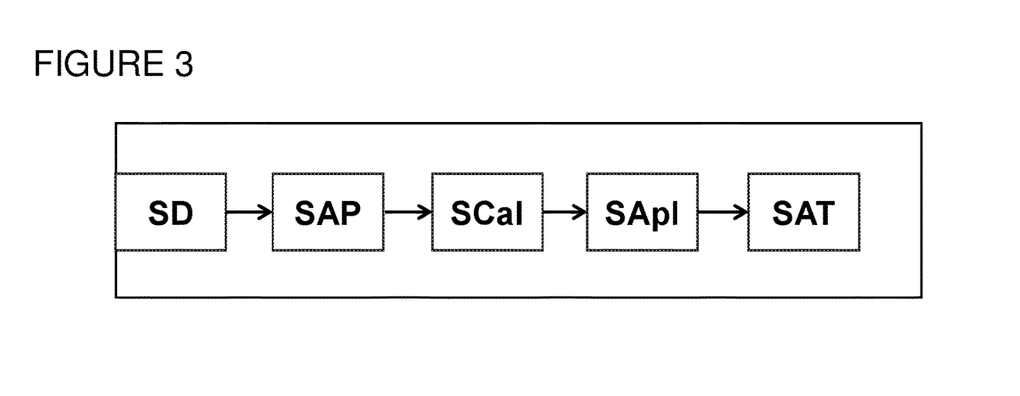
FIG. 3 shows a schematic representation of an embodiment of an automated affective state inference system.

FIG. 3 shows a schematic representation of an embodiment of an automated affective state inference system.

The automated affective state inference system is suitable for determining one or more affective states of a target speaker based on the analysis of speech signals based on the above-mentioned method.

The automated affective state inference system comprises an input SD being suitable for providing speech signals to the system. The speech signals may be provided via an analogue-to-digital converter converting recorded signals or provided by a memory means.

An acoustic voice parameter calculator SAP is coupled to the input SD and suitable for extracting one or more acoustic voice parameters from the speech signals. The acoustic voice parameter calculator SAP may be suitable for performing the above-mentioned method steps for extracting one or more acoustic voice parameters or parts thereof.

A calibrator SCal is coupled to the acoustic voice parameter calculator SAP and suitable for calibrating voice markers of the target speaker. The calibrator SCal may be suitable for performing the above-mentioned method steps for calibrating voice markers or parts thereof.

A predictor SApl is coupled to the calibrator and suitable for inferring two or more appraisal criteria scores from the voice markers. The predictor SApl may be suitable for performing the above-mentioned method steps for applying at least one set of prediction rules for inferring two or more appraisal criteria scores or parts thereof.

An affective state decider SAT is coupled to the predictor SApl and suitable for assigning one or more affective state terms to the two or more appraisal criteria scores. The affective state decider SAT may be suitable for performing the above-mentioned method steps for applying at least one set of prediction rules for inferring two or more appraisal criteria scores or parts thereof.

The system may be embodied as a computer-embedded processor, FPGA (Field Programmable Gate Array), digital signal processor or integrated circuit or a combination thereof.

Embodiments of the method and the system may include combinations of only some of the method steps and the features described above.

The scope of protection is not limited to the examples given herein above. The invention is embodied in each novel characteristic and each combination of characteristics, which particularly includes every combination of any features which are stated in the claims, even if this feature or this combination of features is not explicitly stated in the claims or in the examples.

What is claimed is:

1. A method for automatic affective state inference from speech signals, the method comprising:
    capturing speech signals of a target speaker;
    extracting one or more acoustic voice parameters from the captured speech signals;
    transforming the one or more acoustic voice parameters into voice markers;
    calibrating the voice markers on basis of one or more acoustic voice parameters that have been extracted from the speech signals of the target speaker, one or more speaker-inherent reference parameters of the target speaker and one or more inter-speaker reference parameters of a sample of reference speakers;
    applying at least one set of prediction rules that are based on an appraisal criteria to the calibrated voice markers for inferring at least two or more appraisal criteria scores relating to appraisal of affect-eliciting events with which the target speaker is confronted; and
    assigning one or more affective state terms to the two or more appraisal criteria scores,
    wherein the one or more affective state terms describes an affective state or states most likely experienced by the target speaker before or while the speech signal was produced.

2. The method according to claim 1, wherein extracting one acoustic voice parameter of the one or more acoustic voice parameters comprises:
    calculating a set of intermediate values from the speech signals that are provided within a given time segment; and
    calculating a statistical value from the set of intermediate values or summarizing intermediate values of the set of intermediate values,
    wherein the intermediate values are weighted with a weighting function in dependence on one of the appraisal criteria, and
    wherein the weighting function is time-dependent within the given time segment in which speech signals are provided.

3. The method according to claim 1, wherein the one or more acoustic voice parameters are based on at least one parameter selected from the group consisting of fundamental frequency, pitch, loudness, intensity, perturbation of fundamental frequency, jitter, shimmer, harmonics to noise ratio, spectral balance, spectral envelope, formant frequency bandwidth, formant frequency amplitude, cepstral coefficients, cepstral energy, enhanced cepstral peak prominence, cepstral peak variation, formant dispersion weighted by formant bandwidth, ratio of intra to inter syllable or pseudo-syllable fundamental frequency, ratio of intra to inter syllable or pseudo-syllable intensity variation, ratio of intra to inter syllable or pseudo-syllable loudness variation, a prosodic coherence measure, a statistic of a modulation spectrum of fundamental frequency, a statistic of a modulation spectrum of intensity, a statistic of the modulation spectrum of loudness, and a measure of vocal effort.

4. The method according to claim 1, wherein the one or more acoustic voice parameters are transformed into voice markers by a z-transform calibrating the acoustic voice parameters on basis of speaker-specific mean values of the one or more acoustic voice parameters extracted from reference speech signals of the target speaker during an initial calibration phase and respective per-speaker average variances of one or more acoustic voice parameters having been computed over speech signals of the sample of reference speakers.

5. The method according to claim 1, wherein the mean values and/or the average variances are updated dynamically after the initial calibration phase.

6. The method according to claim 1, wherein the two or more appraisal criteria scores are inferred by different sets of prediction rules, the different sets of prediction rules being based on different combinations of voice markers.

7. The method according to claim 1, wherein one of the appraisal criteria scores is based on a multitude of partial appraisal criteria scores, one partial appraisal criteria score being calculated from one of the voice markers or a weighted sum of a group of voice markers.

8. The method according to claim 7, wherein one of the prediction rules comprises a linear relationship between one of the voice markers and one of the partial appraisal criteria scores or a non-linear relationship between one of the voice markers and one of the partial appraisal criteria scores.

9. The method according to claim 1, wherein four appraisal criteria scores are calculated that are related to an appraisal criteria novelty (N), a pleasantness/conduciveness (P), a control/coping (C) and an urgency/excitation (U) of the affect-eliciting event.

10. The method according to claim 1, wherein assigning the one or more affective state terms comprises:
forming a vector of the two or more appraisal criteria scores;
computing vector distances between the vector and reference vectors representing affective states, thereby inferring strengths of these affective states of the target speaker; and
assigning one or more affective state terms to the vector in dependence on the vector distances.

11. An automated affective state inference system for determining one or more affective states of a target speaker based on an analysis of speech signals, the automated affective state inference system comprising:
an input configured to provide speech signals to the system;
an acoustic voice parameter calculator coupled to the input, the acoustic voice parameter calculator configured to extract one or more acoustic voice parameters from the speech signals;
a calibrator coupled to the acoustic voice parameter calculator, the calibrator configured to:
transform the one or more acoustic voice parameters provided by the acoustic voice parameter calculator into voice markers: and
calibrate the voice markers on basis of the one or more acoustic voice parameters that have been extracted from the speech signals of the target speaker, one or more speaker-inherent reference parameters of the target speaker and one or more inter-speaker reference parameters of a sample of reference speakers;
a predictor coupled to the calibrator, the predictor configured to infer at least two or more appraisal criteria scores from the calibrated voice markers by at least one set of prediction rules that is based on the appraisal criteria; and
an affective state decider coupled to the predictor,
wherein the affective state decider is configured to assign one or more affective state terms to the two or more appraisal criteria scores, and
wherein the one or more affective state terms describes an affective state or states most likely experienced by the target speaker before or while the speech signal was produced.

12. The automated affective state inference system according to claim 11, wherein the acoustic voice parameter calculator is configured to:
calculate a set of intermediate values from the speech signals that are provided within a given time segment; and
calculate a statistical value from the set of intermediate values or summarize the intermediate values of the set of intermediate values,
wherein the intermediate values are weighted with a weighting function in dependence on one of the appraisal criteria, and
wherein the weighting function is time-dependent within the given time segment in which the speech signals are provided.

13. The automated affective state inference system according to claim 11, wherein the calibrator is configured to:
calculate and store speaker-specific mean values of the one or more acoustic voice parameters;
store per-speaker average variances of the one or more acoustic voice parameters; and
transform the one or more acoustic voice parameters into the voice markers by a z-transform calibrating the acoustic voice parameters on basis of the speaker-specific mean values of the one or more acoustic voice parameters extracted from reference speech signals of the target speaker during an initial calibration phase and the respective per-speaker average variances of the one or more acoustic voice parameters having been computed over speech signals of the sample of reference speakers.

14. The automated affective state inference system according to claim 11, wherein the predictor is configured to infer the appraisal criteria scores by different sets of prediction rules based on different combinations of voice markers.

15. The automated affective state inference system according to claim 11, wherein the affective state decider is configured to:
compute vector distances between the vector of the two or more appraisal criteria scores and reference vectors representing affective states, thereby inferring strengths of the affective states of the target speaker; and
assign one or more affective state terms to the vector in dependence of the vector distances.

* * * * *

UNITED STATES PATENT AND TRADEMARK OFFICE
CERTIFICATE OF CORRECTION

PATENT NO. : 10,991,384 B2
APPLICATION NO. : 15/959045
DATED : April 27, 2021
INVENTOR(S) : Florian Eyben et al.

Page 1 of 1

It is certified that error appears in the above-identified patent and that said Letters Patent is hereby corrected as shown below:

In the Claims

In Column 25, Line 18, Claim 5, delete "claim 1" and insert --claim 4--.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*